United States Patent
Miller

(10) Patent No.: US 11,347,860 B2
(45) Date of Patent: May 31, 2022

(54) RANDOMIZING FIRMWARE LOADED TO A PROCESSOR MEMORY

(71) Applicant: Seagate Technology LLC, Cupertino, CA (US)

(72) Inventor: Michael H. Miller, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 267 days.

(21) Appl. No.: 16/674,772

(22) Filed: Nov. 5, 2019

(65) Prior Publication Data

US 2020/0410102 A1 Dec. 31, 2020

Related U.S. Application Data

(60) Provisional application No. 62/868,345, filed on Jun. 28, 2019.

(51) Int. Cl.
 *G06F 21/57* (2013.01)
 *G06F 7/58* (2006.01)

(52) U.S. Cl.
 CPC ......... *G06F 21/572* (2013.01); *G06F 7/588* (2013.01); *G06F 2221/033* (2013.01)

(58) Field of Classification Search
 CPC ... G06F 21/572; G06F 7/588; G06F 2221/033
 See application file for complete search history.

(56) References Cited

U.S. PATENT DOCUMENTS

| | | | |
|---|---|---|---|
| 5,321,748 A * | 6/1994 | Zeidler | H04N 7/1696 348/E7.059 |
| 5,442,705 A | 8/1995 | Miyano | |
| 6,061,449 A | 5/2000 | Candelore et al. | |
| 6,950,937 B2 | 9/2005 | Jakobsson et al. | |
| 7,350,085 B2 * | 3/2008 | Johnson | G06F 12/1408 711/202 |
| 7,548,483 B2 | 6/2009 | Cullum et al. | |
| 7,958,321 B2 * | 6/2011 | Kwon | G06F 12/0607 711/150 |
| 8,370,561 B2 * | 2/2013 | Sharon | G11C 16/10 711/103 |
| 9,134,994 B2 | 9/2015 | Patel et al. | |
| 9,459,867 B2 | 10/2016 | Bradbury et al. | |
| 10,511,433 B2 * | 12/2019 | Courtney | H04L 9/005 |

(Continued)

*Primary Examiner* — Aurel Prifti
(74) *Attorney, Agent, or Firm* — Hall Estill Law Firm

(57) ABSTRACT

Apparatus and method for protecting firmware and other types of control data used in a processor-based device, such as but not limited to a solid-state drive (SSD). In some embodiments, the firmware is stored in a firmware store as a plurality of program instructions in a first sequence. The program instructions are loaded to a local memory in a different, second sequence. In some cases, a random number is generated and the second sequence is selected using the random number. A translation table may be generated and used by a programmable processor to locate the various program instructions in the second sequence. In other cases, instructions with calls and other references to other instruction lines are modified based on the order in the local memory. Other forms of control data may also be generated and stored to the local memory in a random order and interspersed with the firmware.

20 Claims, 5 Drawing Sheets

(56) References Cited

U.S. PATENT DOCUMENTS

| | | | |
|---|---|---|---|
| 11,017,128 B2* | 5/2021 | Courtney | G06F 21/79 |
| 2007/0291553 A1 | 12/2007 | Kim | |
| 2008/0082798 A1 | 4/2008 | Bloomfield et al. | |
| 2008/0263117 A1* | 10/2008 | Rose | G06F 7/588 |
| | | | 708/254 |
| 2009/0065392 A1* | 3/2009 | Gustin | B65D 5/32 |
| | | | 206/586 |
| 2009/0204824 A1* | 8/2009 | Lin | G11B 20/0021 |
| | | | 713/193 |
| 2010/0332732 A1* | 12/2010 | Chiang | G06F 12/0246 |
| | | | 711/103 |
| 2012/0079171 A1* | 3/2012 | Ju | G11C 7/1072 |
| | | | 711/103 |
| 2012/0331303 A1* | 12/2012 | Andersson | G06F 21/51 |
| | | | 713/189 |
| 2015/0074329 A1* | 3/2015 | Kondo | G06F 12/1408 |
| | | | 711/103 |
| 2016/0028544 A1* | 1/2016 | Hyde | G06F 3/0637 |
| | | | 380/44 |
| 2016/0124716 A1* | 5/2016 | Venkata | G06F 7/588 |
| | | | 708/250 |
| 2016/0342394 A1* | 11/2016 | Tsirkin | G06F 7/588 |
| 2017/0300423 A1* | 10/2017 | Kamruzzaman | G06F 12/109 |
| 2018/0024920 A1 | 1/2018 | Thomas et al. | |
| 2018/0059933 A1* | 3/2018 | Helmick | G06F 3/061 |
| 2019/0042278 A1* | 2/2019 | Pirvu | G06F 9/4411 |
| 2019/0065392 A1* | 2/2019 | Erez | G06F 12/1009 |
| 2019/0179543 A1* | 6/2019 | Sharon | G11C 16/3427 |
| 2019/0286556 A1* | 9/2019 | You | G06F 12/0261 |
| 2019/0347385 A1* | 11/2019 | Shelly | G06F 21/554 |
| 2020/0014705 A1* | 1/2020 | Cui | H04L 63/20 |
| 2020/0133572 A1* | 4/2020 | Park | G06F 3/0632 |
| 2020/0145395 A1* | 5/2020 | Kanungo | H04L 63/0428 |
| 2020/0201785 A1* | 6/2020 | Hanna | G06F 11/1004 |
| 2020/0202002 A1* | 6/2020 | Graham | G06F 21/572 |
| 2020/0210587 A1* | 7/2020 | Shi | G11C 29/08 |

* cited by examiner

LOADING SEQUENCE N

LOADING SEQUENCE N+1

RANDOMIZING FIRMWARE LOADED TO A PROCESSOR MEMORY

RELATED APPLICATION

The present application makes a claim of domestic priority to U.S. Provisional Patent Application No. 62/868,345 filed Jun. 28, 2019, the contents of which are hereby incorporated by reference.

SUMMARY

Various embodiments of the present disclosure are generally directed to processor-based systems, such as but not limited to data storage devices.

In some embodiments, firmware is stored in a firmware store as a plurality of program instructions in a first sequence. The program instructions are loaded to a local memory in a different, second sequence. In some cases, a random number is generated and the second sequence is selected using the random number. A translation table may be generated and used by a programmable processor to locate the various program instructions in the second sequence. Alternatively, instruction lines with calls to different instruction lines may be modified based on the new relative locations in the memory so that no translation table is required. Other forms of control data may also be generated and stored to the local memory in a random order and interspersed with the firmware.

These and other features which characterize various embodiments of the present disclosure can be understood in view of the following detailed discussion and the accompanying drawings.

DETAILED DESCRIPTION

Figure 1:
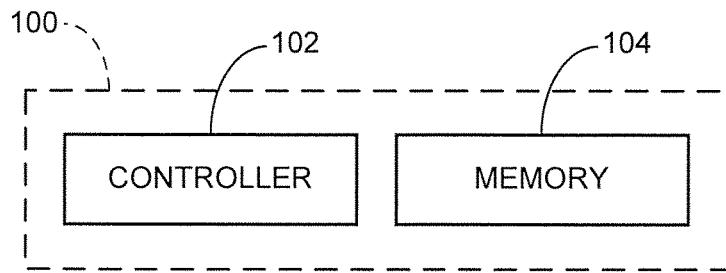
FIG. 1 is a functional block representation of a data storage system which operates in accordance with various embodiments of the present disclosure.

The present disclosure is generally directed to the area of processor-based devices and, more particularly, to enhancing device security by protecting against malware or other forms of attacks upon firmware in a device, such as but not limited to a solid-state drive (SSD).

Processor-based devices utilize one or more programmable processors that execute programming instructions stored in a memory to carry out various functions. The programming instructions may be arranged as firmware (FW), which constitutes a sequence of machine code executable elements that may be stored in a non-volatile memory (NVM) such as a ROM memory, NOR or NAND flash memory, a rotatable magnetic recording disc, etc. During an initialization (boot) sequence, the firmware is loaded from the NVM to a local memory (such as a DRAM) for sequential execution by the processor(s) to control the overall function of the device.

Firmware is a type of software that is normally used at the lowest level of a program hierarchy to enable and control basic operation of the device. Higher layers of software, such as an operating system, an application, etc., may be loaded and executed once the firmware has been loaded and is up and running. A typical distinction of firmware is that firmware code is semi-permanent, relatively small, and is updated infrequently, if at all, during the operational lifetime of a device.

Once a set of firmware has been loaded, the firmware is typically maintained in the local volatile memory and executed as required until the device is rebooted. In addition to the firmware, the system may maintain other forms of control data in the local memory as well, such as tables, metadata, etc. These elements may be loaded from NVM during the boot process, or they may be built by the firmware while the firmware is being executed.

A potential attack point in which an attacking party may attempt a security breach is based on observing where various firmware modules, tables, metadata and other forms of control data are loaded and used during device operation. Should an attacker be able to determine that a particular module is always loaded to a particular location in DRAM during execution, the attacker may be able to carry one a variety of attacks to gain access to the device or learn important side-channel information about the device.

For example, the attacker may be able to insert malicious code at that location to cause the device to perform an undesired function. In another scenario, the attacker may be able to perform a differential power analysis (DPA) based on the fact that the attacker determines that the FW code called from a certain memory location is a cryptographic function. Still other scenarios involve modifying the behavior of the device based on changing specific metadata such as cryptographic keys stored at a memory location, and so on.

Various embodiments of the present disclosure thus operate to enhance device security by changing the storage locations of firmware and other forms of control data. As explained below, some embodiments use a boot loader or similar circuit to randomly assign the locations in the local memory at which the various modules should be placed, after which the FW modules are written to those locations. In addition, the firmware can be designed to randomize the structures and the memory locations of tables and other metadata to make it more difficult for an attacker to alter critical structures. A local random number generator or other entropy source can provide random numbers that can be used to randomly assign the memory locations.

The various modules may be the same size or differently sized. In some cases, the modules are arranged and executed in a first sequential order from an address or use standpoint, and the modules can be reordered randomly then written in a second random order so that the order of the instructions in the local memory does not correspond to the normal arrangement of the FW.

As part of the boot process, look up tables or translation tables can be generated and used to track the locations of the FW modules, enabling the processor to locate the proper instructions or data for use by the processor. In many systems a portion of the volatile memory is located internal to a VLSI controller chip (also sometimes referred to as a system on chip, or SOC) while another portion is stored in a memory such as DRAM than is located outside the VLSI chip. It is envisioned that the internal memory can be used to store data for address translation to further obfuscate the program flow to an attacker.

Another approach to randomizing the firmware and metadata in some embodiments is to have the boot loader modify the firmware flow control instructions and data access instructions directly during the randomization process. In this way, the actual instructions such as jumps, calls, data fetches, data stores, etc., are modified to reflect the randomized placement of the firmware modules and other control data, and no separate translation table is necessary.

Other FW verification steps can be carried out as well during the boot loading process to ensure that the correct FW is loaded to the device.

These and other features and advantages of various embodiments can be understood with a review of FIG. 1 which shows a data storage device 100. The data storage device includes a controller 102 and a memory 104. The controller 102 can include one or more programmable processors that execute programming in the form of firmware (FW) to carry out various top level control functions to transfer user data blocks between the memory 104 and a host device (not shown in FIG. 1). The memory 104 includes non-volatile memory (NVM) in any number of forms including solid-state semiconductor memory (e.g., flash memory, etc.), rotatable magnetic recording discs, etc.

Figure 2:
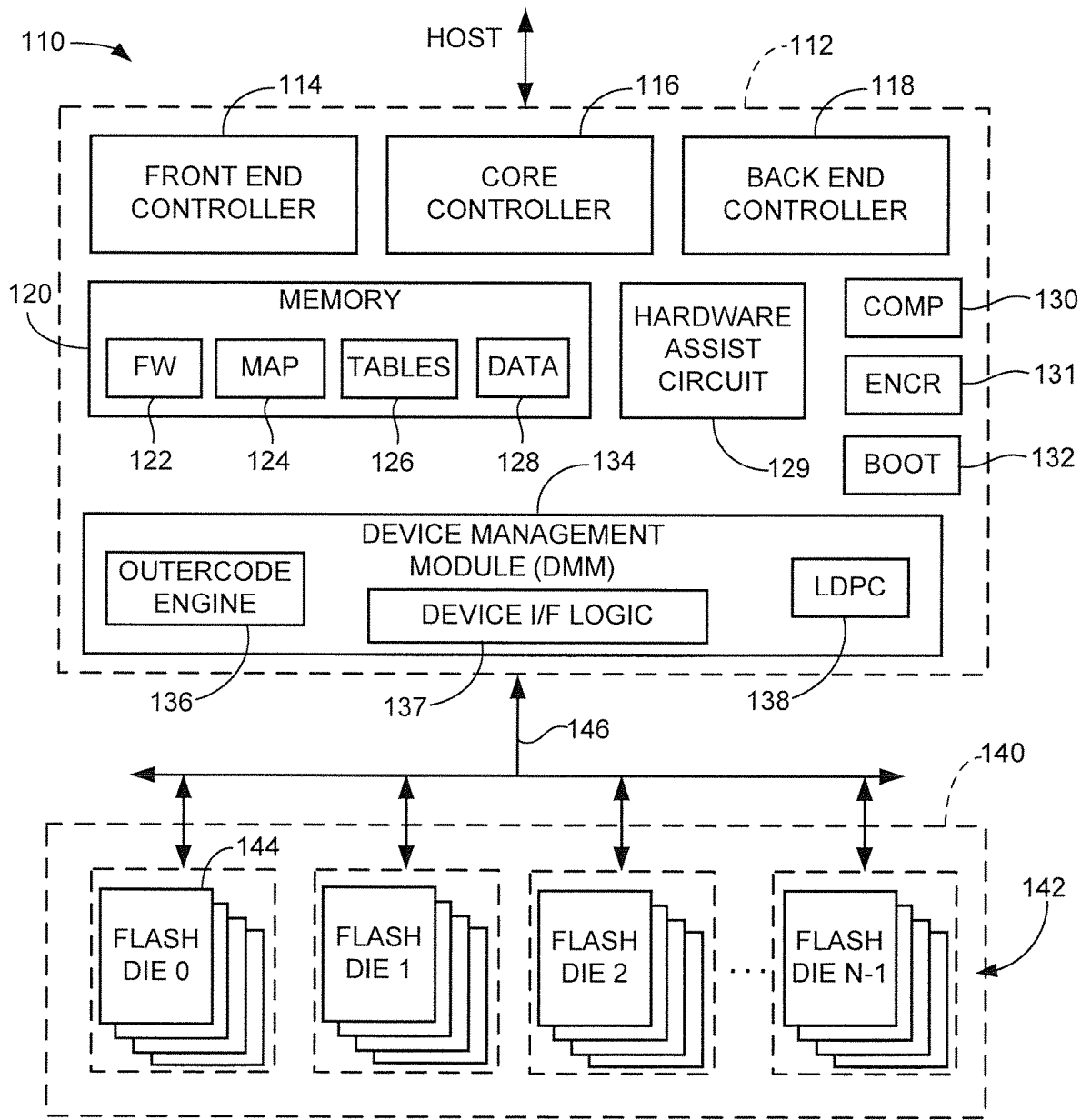
FIG. 2 shows a configuration of the data storage device of FIG. 1 as a solid-state drive (SSD) in accordance with some embodiments.

FIG. 2 shows a data storage device 110 that corresponds to the data storage device 100 of FIG. 1 in some embodiments. The data storage device 110 is characterized as a solid-state drive (SSD), although such is merely for purposes of illustration and is not limiting.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming as well as various hardware elements to execute data management and transfer functions. Each of the controllers 114, 116 and 118, as well as other elements of the circuitry shown in FIG. 2, may be incorporated into a system on chip (SOC) device.

A controller memory 120 represents one or more forms of volatile and/or non-volatile memory (e.g., SRAM, DDR DRAM, flash, etc.) utilized as local memory by the controller 112. At least some of these memory structures may be external to the SOC, while other portions of the memory may be incorporated into the SOC.

Various data structures and data sets are stored by the memory 120 during operation. These elements include firmware (FW) 122, one or more map structures 124, various control tables 126 and other control information such as metadata, etc., and cached user data 128 temporarily stored during data write (programming) and read operations. Of particular interest is the manner in which the firmware, map, tables, metadata and other control information (collectively referred to herein as "control data") are arranged in the memory 120. This will be discussed in detail below.

A non-processor based hardware assist circuit 129 may enable the offloading of certain memory management tasks by one or more of the controllers as required. The hardware circuit 129 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in or adjacent the controller 112, such as a data compression block 130, an encryption block 131 and a boot loader block 132. The data compression block 130 applies lossless data compression to input data sets during write operations, and subsequently provides data de-compression during read operations. The encryption block 131 applies cryptographic functions including encryption, hashes, decompression, etc. The boot loader block 132 is operative to provide boot code to transition the SSD from an inactive state to an operationally ready state.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the SSD 110.

A memory module 140 corresponds to the memory 104 in FIG. 1 and includes a non-volatile memory (NVM) in the form of a flash memory 142 distributed across a plural number N of flash memory dies 144. Flash memory control electronics (not separately shown in FIG. 2) may be provisioned on each die 144 to facilitate parallel data transfer operations via a number of channels (lanes) 146.

Figure 3:
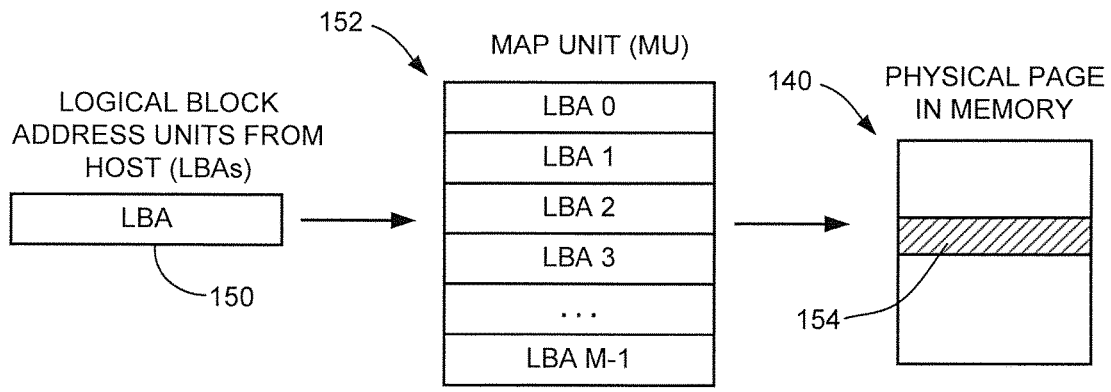
FIG. 3 shows an arrangement of data stored to the flash memory of the SSD of FIG. 2 in some embodiments.

FIG. 3 illustrates a manner in which user data may be arranged for storage by the flash memory 140. Other arrangements may be used so this is merely illustrative and not limiting. Data blocks 150 are identified at the host device level as logical block addresses (LBAs). These blocks have a first selected size depending on the operation of the host device such as 512 bytes (B), 1024 B, etc.

A number of LBAs 150 are combined into map units (Mus) 152 of a second larger size, such as 8192B, etc. The map units are thereafter arranged into LDPC code words (not separately shown) with both user data bits and code (e.g., LDPC) bits which are then written as physical pages 154 in the flash memory 140. It will be appreciated that, because flash memory cells require an intervening erasure (garbage collection) operation before the memory cells can be reset to accept new memory, new versions of the LBAs are written to new locations within the memory. The map data and other forms of the metadata are utilized to track the locations of the most current versions of the data blocks stored by the flash memory.

Figure 4:
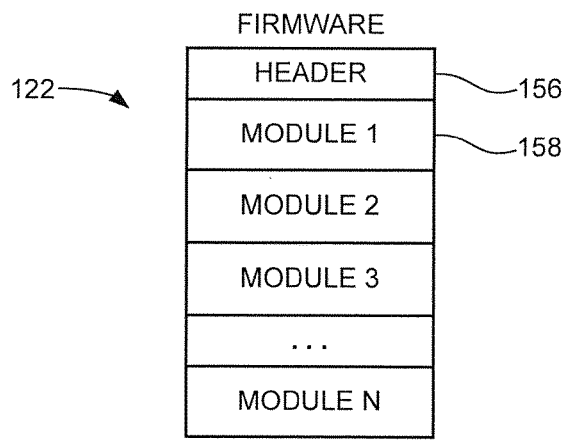
FIG. 4 illustrates an exemplary arrangement of firmware (FW) utilized by the SSD in some embodiments.

FIG. 4 illustrates an exemplary format for the firmware (FW) 122 utilized by the SSD 110 in some embodiments. Other formats can be used. The firmware includes a header 156 and a plural number of firmware modules 158 numbered as modules 1 to N.

The firmware header 156 provides control information including version information relating to a current version number of the firmware, date/time code stamps indicating installation dates, and so on. The embedded control information need not necessarily be arranged in the form of a header at the beginning portions of the firmware, so long as the information can be recalled as required.

The firmware modules 158 can represent individual portions or sections of the firmware that are called and executed as units of code to carry out specific functions of the SSD. Without limitation, these can include modules that are executed responsive to specific commands from the host device (such as, e.g., read commands, write commands, etc.). It will be appreciated that any number of firmware modules can be supplied to account for different characteristics and operational functions of the SSD, and that, alternatively, the firmware need not necessarily be arranged as individual modules as shown.

When the firmware is arranged as separate modules, each module will generally contain a list of instructions in a particular sequence. In some cases, the randomization of the firmware will be carried out on a module-by-module basis, so that the program instructions in each module remain in the established order, but the relative ordering of the modules within the memory will be different each time the firmware is loaded.

Figure 5:
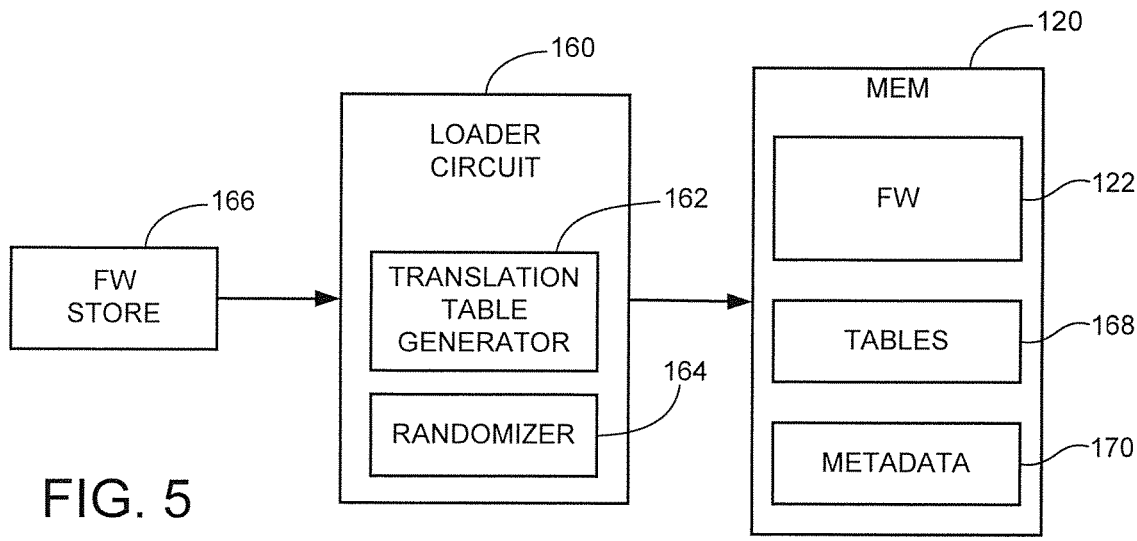
FIG. 5 is a functional block representation of a memory loader circuit of the SSD operative to load firmware and other types of control data to a local memory during an initialization operation of the SSD in accordance with some embodiments.

FIG. 5 is a functional representation of a control data memory loader circuit 160 constructed and operated in accordance with various embodiments. The circuit 160 can be realized in hardware or as one or more programmable processors that execute specialized code during the loading of firmware and other control data at selected points during operation, such as during initialization (boot sequencing).

The loader circuit 160 includes a translation table generation circuit 162 and a randomizer circuit 164. As explained below, the loader circuit 160 operates to access a firmware (FW) store 166 to retrieve the various elements of the firmware described above in FIG. 4, such as but not necessarily limited to a module-by-module basis. The FW store 166 may comprise a selected portion of the flash memory 140, or some other non-volatile memory (NVM) location of the SSD 110 at which a master copy of the firmware is stored.

The firmware 122, as well as various tables 168, metadata 170 and other control data such as discussed above, are loaded to various locations in the controller memory 120. While not limiting, it is contemplated that the portion of the controller memory 120 to which the loader circuit loads the control data constitutes an external DRAM circuit that is coupled to the SOC of the controller 112.

Figure 6A:
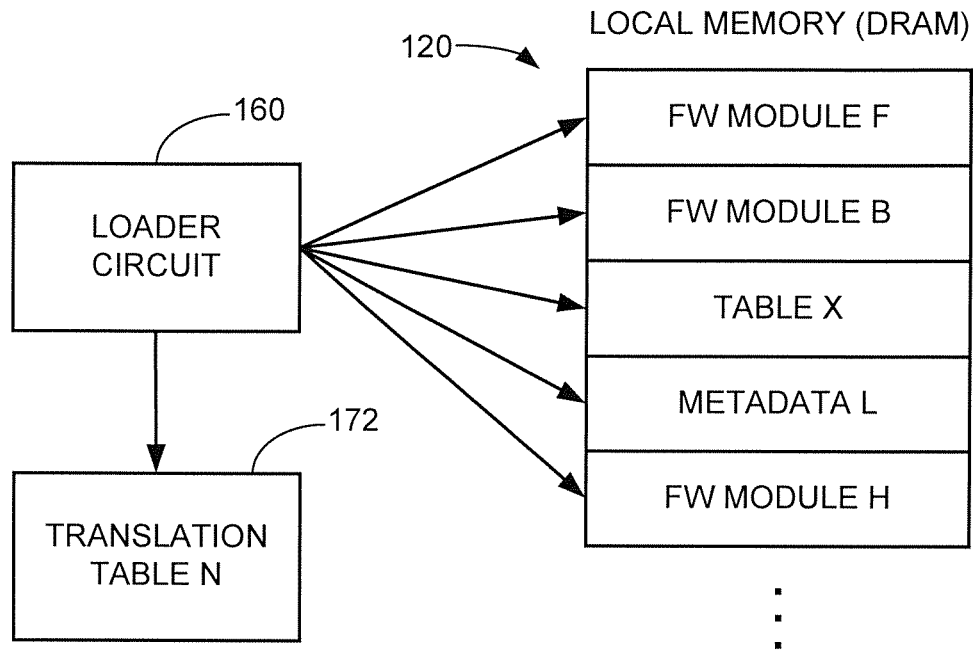
FIGS. 6A and 6B show different sequences of the control data during different initialization operations.
Figure 6B:
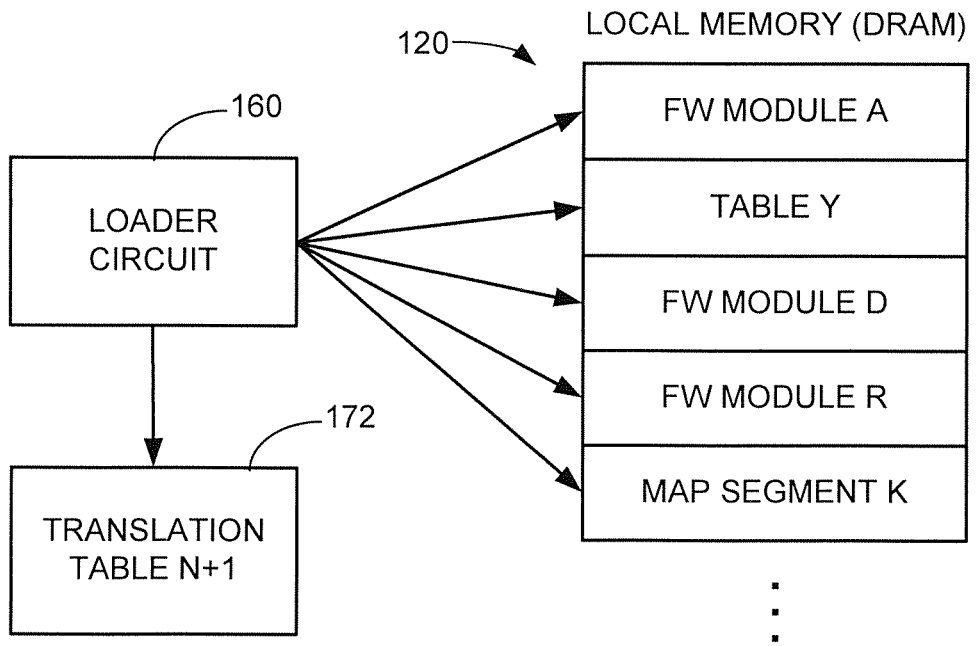

Each time that the loader circuit 160 loads the control data to the memory, the various control data elements are placed in a different location and a different order. This is generally illustrated in FIGS. 6A and 6B, which illustrate two different successive loading sequences (N and N+1, respectively). As can be seen, various ones of the respective firmware modules, tables, metadata, map segments, etc. are located at different addresses/physical locations in the DRAM memory 120. While each of these elements is shown to have the same size (e.g., memory footprint), in practice it is contemplated that these elements will occupy different respective numbers of lines (addresses) in the DRAM memory.

FIGS. 6A and 6B further show the operation of the translation table generator circuit 162 (FIG. 5) in generating one or more translation tables 172. The translation tables serve to allow the controller 112 to locate the various control data elements as needed. A look up table or other data structure format can be used to allow the needed element(s) to be located efficiently and retrieved from memory based on the order and locations at which the elements reside.

Figure 7:
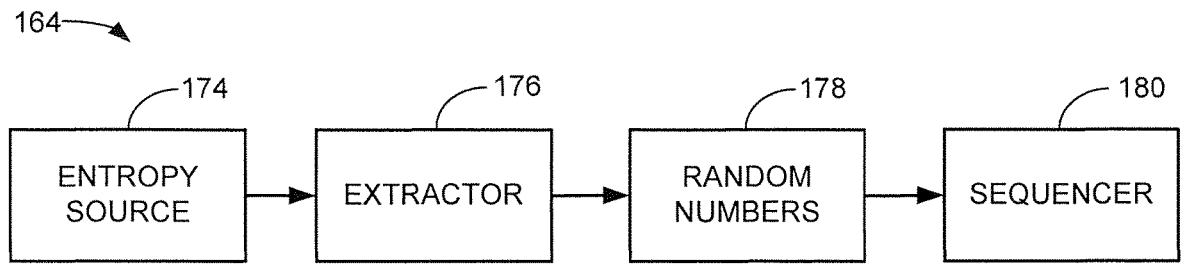
FIG. 7 shows a randomization circuit of the loader circuit of FIG. 5 in some embodiments.

FIG. 7 shows the randomizer circuit 164 (FIG. 5) of the loader circuit 160 in some embodiments. Other arrangements can be used. The randomizer 164 generally operates to select the ordering and locations of the control data elements so that a different relative sequence is used during each initialization. To this end, random numbers can be generated by accessing one or more entropy sources 174, and applying an extractor mechanism 176 to arrive at a set of random numbers 178. The random numbers can thereafter be used by a sequencer 180 to order the control data elements in a random order. The random numbers can be true random numbers or pseudo-random numbers. Other mechanisms such as ring-oscillators, etc., can be used to generate the random numbers.

Without limitation, the firmware and other control data elements may exist in or otherwise have a first sequential order as arranged in the firmware store 166 and other locations within the SSD 110. During the loading operation, the random numbers can be used to randomly assign each of the elements with a different number that is out of order. This produces a second sequence in which the elements can thereafter be successively written to the memory. As desired, various boundaries can be observed to maintain efficient locations of the various elements.

Figure 8:
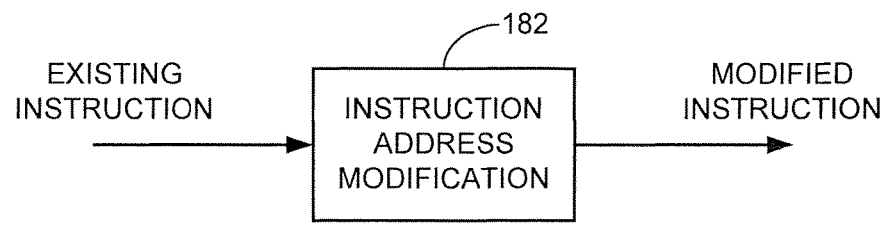
FIG. 8 shows an instruction address modification circuit of the loader circuit of FIG. 5 in some embodiments.

FIG. 8 shows aspects of the loader circuit 160 in accordance with further embodiments. An instruction address modification circuit 182 can be used to modify existing instructions of the firmware to reflect new address locations. For example, some instructions may involve operations such as jumps, calls, data fetches, data stores, returns, etc. that direct an instruction to another instruction. In this case, the new address locations can be identified for the instructions and this information inserted directly into the firmware code. It will be appreciated that a different set of modifications will be applied to these types of instructions during each loading event.

Figure 9:
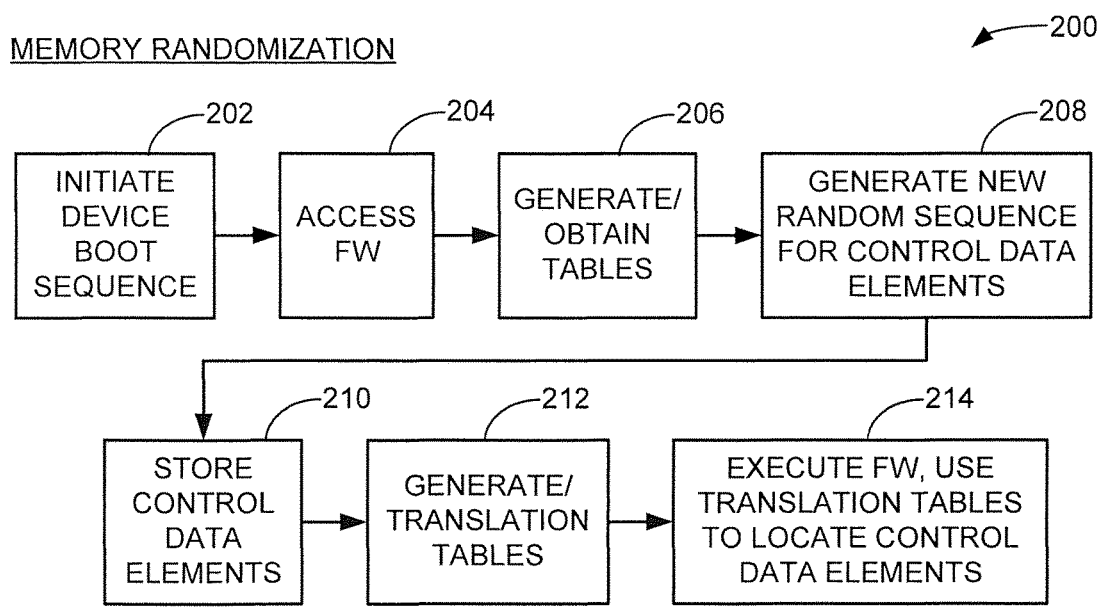
FIG. 9 shows an operational sequence for a memory randomization operation carried out by the SSD in accordance with some embodiments.

FIG. 9 shows a sequence diagram 200 for a memory randomization operation carried out by the loader circuit 160 in accordance with the foregoing discussion. An initial device boot sequence is initiated at block 202. As will be appreciated, a typical boot initialization sequence may involve various initial self tests and other operations to prepare the device for the loading of the firmware. At such time that the system is ready for the firmware (and other control data) be loaded, the firmware is accessed from the firmware store at block 204, and the other control elements such as tables are generated or otherwise obtained at block 206.

A new random sequence for the various elements is assigned at 208, after which the elements are stored in this sequence at block 210. While it is contemplated that the various types of control data will be interspersed (e.g., tables may be stored between different firmware modules, etc. as depicted in FIGS. 6A and 6B), in other embodiments the different types of control data may be maintained together, but self-scrambled within each block (e.g., the firmware modules 158 from FIG. 3 may be all stored together but in some other non-sequential order other than from 1 to M, etc.).

The translation tables such as depicted at 172 are generated and provided to the controller 112 at block 212, after which the firmware is executed with the tables being used as required to enable the controller to locate and read the firmware during operation, block 214.

Figure 10:
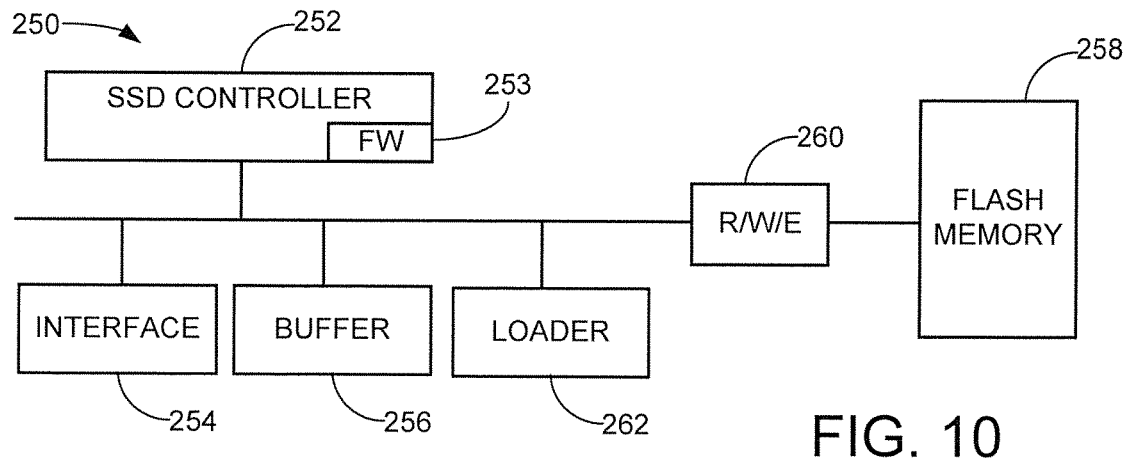
FIG. 10 is a functional block representation of the SSD in further embodiments.
Figure 11:
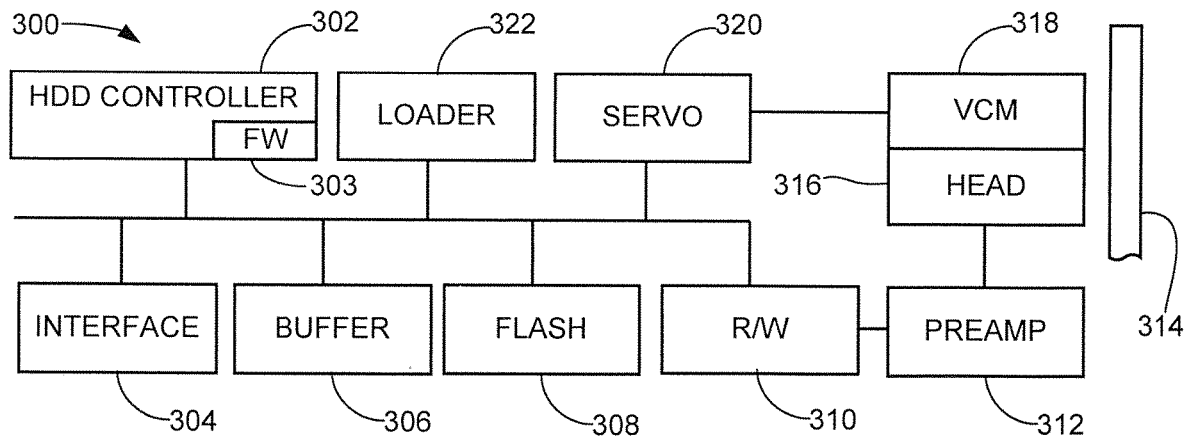
FIG. 11 is a functional block representation of the data storage device of FIG. 1 alternately characterized as a hard disc drive (HDD) or a hybrid solid-state drive (HSSD) in further embodiments.

FIGS. 10 and 11 have been provided to illustrate further details regarding suitable environments for the use of the firmware verification operations described herein. FIG. 10 shows a functional block diagram for a solid state drive (SSD) data storage device 250 similar to the SSD 110 discussed above.

An SSD controller circuit 252 executes firmware (FW) 254 to provide top level control for the device 250. An interface circuit 254 and local buffer memory 256 coordinate the transfer of user data between an external host device and a flash memory 258. A read/write/erase circuit 260 performs the requisite encoding of input write data and directs the programming of the appropriate flash memory cells to write the encoded write data to the memory 258. A control data memory loader circuit 262 operates as described above to load the firmware 253 and other control data elements during initialization of the device 250, and provides the requisite translation tables or other mechanisms to allow the firmware to be used by the controller 252.

FIG. 11 provides a functional block diagram for a hard disc drive (HDD) or hybrid solid state drive (HSSD) storage device 300 in some embodiments. An HDD controller circuit 302 with firmware 303, interface circuit 304 and buffer memory 306 operate as in FIG. 10 to coordinate data transfers with a host device. A flash memory 308 provides local non-volatile semiconductor memory for storage of data. A read/write (R/W) channel 310 and preamplifier/driver (preamp) 312 support transfers of data to a rotatable recording medium (disc) 314 using a data read/write transducer (head) 316. Head position is controlled using a voice coil motor (VCM) 318 and a closed loop servo control circuit 320.

Data from the host may be stored to the flash 308 and/or the disc 314 as required. As before, the channel 310 encodes the data during a write operation, and uses appropriate signal processing to recover the data during a subsequent read operation. Separate channels may be used for the flash and the disc. A control data memory loader circuit 322 loads the firmware 303 during device initialization and provides the translation tables or other tracking mechanisms to enable use of the firmware by the controller 302.

While the various embodiments presented above have been directed to the environment of a data storage device, such is merely exemplary and is not limiting. Substantially any processing environment that utilizes firmware can benefit from the implementation of the various principles disclosed herein.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A computer implemented method comprising:
   storing firmware (FW) as a plurality of program instructions in a FW store comprising a non-volatile memory (NVM), the program instructions arranged in the FW store in a first address sequence;
   performing an initialization operation by generating a random number and loading the plurality of program instructions from the FW store into a local volatile memory, the loaded program instructions arranged in the local volatile memory in a different, second address sequence selected responsive to the random number; and
   using a programmable processor to execute the loaded program instructions in the local volatile memory, a different random number generated and used during each subsequent initialization operation to load the plurality of program instructions to the local volatile memory.

2. The method of claim 1, wherein the initialization operation and each subsequent initialization operate transitions a device incorporating the FW store, the local volatile memory and the programmable processor from a deactivated state to an operationally ready state.

3. The method of claim 2, wherein the device is a data storage device and the NVM comprises at least a selected one of a solid-state semiconductor memory or a rotatable magnetic recording disc.

4. The method of claim 1, wherein the program instructions of the firmware are arranged into a plurality of modules, and wherein the modules are stored in the local volatile memory in a different order during the initialization operation and during each subsequent initialization operation.

5. The method of claim 1, further comprising generating a translation table as a data structure in a memory that enables the programmable processor to convert a first address associated with the first address sequence to a second address corresponding to the second address sequence during execution of the loaded program instructions.

6. The method of claim 1, further comprising extracting entropy from an entropy source to generate the random number.

7. The method of claim 1, wherein the programmable processor is incorporated into a system on chip (SOC) integrated circuit device, wherein the local memory is an external DRAM circuit coupled to the SOC, and wherein the FW store is an external memory coupled to the SOC.

8. The method of claim 7, wherein the SOC further comprises an internal volatile memory, and wherein the method further comprises generating and storing a translation table in the internal volatile memory, the translation table serving as a translation layer between the respective first and second address sequences.

9. The method of claim 1, further comprising modifying at least one program instruction to identify an address of the second address sequence in the local volatile memory to accommodate a jump between non-consecutive instructions in the FW.

10. A data storage device, comprising:
    a main storage memory arranged as a non-volatile memory (NVM) configured to store user data from a host device;
    a controller circuit comprising a programmable processor;
    a local volatile memory coupled to the controller circuit;
    a firmware (FW) storage memory arranged as an NVM configured to store firmware as a plurality of program instructions for execution by the programmable processor, the program instructions arranged in a first sequence in the FW storage memory;
    a control data memory loader circuit configured to transfer a copy of the program instructions from the firmware storage memory to the local volatile memory during each initialization of the data storage device, the copy of the program instructions rearranged in a different sequence in the local volatile memory during each said initialization of the data storage device to enhance security of the user data stored in the main storage memory.

11. The data storage device of claim 10, further comprising a random number generator circuit configured to generate a random number, wherein the control data memory loader circuit arranges the program instructions in the different sequence in the local volatile memory responsive to the random number, and wherein a different random number is generated and used during each said initialization of the data storage device.

12. The data storage device of claim 10, characterized as a solid-state drive (SSD), wherein the main storage memory comprises flash memory, wherein the SSD is one of a population of additional SSDs nominally identical to the SSD, and wherein an identical copy of the firmware in the first sequence is stored in the FW storage memory of each of the additional SSDs.

13. The data storage device of claim 10, characterized as a hard disc drive (HDD) or a hybrid solid state drive (HSSD), wherein the main storage memory comprises at least one rotatable magnetic recording disc, wherein the HDD or the HSSD is one of a population of additional HDDs or HSSDs nominally identical to the HDD or the HSSD, and wherein an identical copy of the firmware in the first sequence is stored in the FW storage memory of each of the additional HDDs or HSSDs.

14. The data storage device of claim 10, wherein each said initialization of the data storage device transitions the data storage device from a deactivated state to an operationally ready state.

15. The data storage device of claim 10, wherein control data associated with the firmware is generated during the loading of the firmware to the local volatile memory, and the control data is randomly stored interspersed with the program instructions of the firmware.

16. The data storage device of claim 10, wherein the control data memory loader circuit further generates a translation table as a data structure in a memory that enables the programmable processor to convert a first address associated with the first sequence to a second address corresponding to the second sequence.

17. The data storage device of claim 16, wherein the controller circuit is incorporated into a system on chip (SOC) integrated circuit having internal volatile memory, wherein the local volatile memory is an external DRAM memory coupled to the SOC integrated circuit, and wherein the translation table is stored in the internal volatile memory.

18. A processing device, comprising:

a programmable processor with associated processor memory;

a local volatile memory coupled to the controller circuit;

a firmware (FW) storage memory arranged as an NVM configured to store firmware as a plurality of program instructions for execution by the programmable processor, the program instructions arranged in a first sequence in the FW storage memory;

a control data memory loader circuit configured to transfer a copy of the program instructions from the firmware storage memory to the local volatile memory, the copy of the program instructions rearranged in a different, second sequence in the local volatile memory to enhance security of the user data stored in the main storage memory, the control data memory loader circuit configured to modify an address in at least one of the program instructions written to the local volatile memory to accommodate a jump between non-consecutive instructions in the firmware based on the second sequence of the program instructions in the local volatile memory.

19. The processing device of claim 18, wherein the control data memory loader circuit generates the different, second sequence responsive to a random number, and wherein a different random number is used each time the control data memory loader circuit transfers the copy of the program instructions from the firmware storage memory to the local volatile memory.

20. The processing device of claim 18, wherein the firmware in the firmware storage memory has a selected version number, wherein the processing device is one of a population of additional processing devices nominally identical to the processing device and each having a corresponding firmware storage memory, and wherein an identical copy of the firmware having the selected version number is stored in the first sequence in the firmware storage memory of each of the additional processing devices.

* * * * *